Patented Aug. 13, 1929.

1,724,718

UNITED STATES PATENT OFFICE.

JACOB LAEUFER, OF DETROIT, MICHIGAN.

BRAKE-SHOE FILLING AND LINING.

No Drawing.    Application filed June 11, 1927. Serial No. 198,305.

This invention has reference to improvements in brake shoe fillings and linings, and relates more particularly to, and is an improvement upon, the compositions as set forth in my prior U. S. Letters Patent Nos. 818,833, and 909,617, granted, respectively, April 24, 1906 and January 12, 1909.

An object of the invention is to provide an improved artificial material which possesses a relatively high co-efficient of friction, and which is capable of resisting the heat tendency thereof due to the friction generated between the material and a wheel or other object with which it cooperates.

A still further object is to provide a composition of matter of the friction-resisting type which will be substantially fireproof and waterproof, and which will have high wear-resisting qualities without lessening its frictional qualities.

Other objects will appear as the description proceeds.

The composition in its elemental form consists of a base or body composed preferably of vegetable matter, such, for instance, as sawdust, straw, excelsior or similar material which may be ground or pulverized to the desired degree of fineness, and this constituent of the composition is hardened by an indurating and binding agent, preferably Portland cement. A heat-resisting agent, such as mineral wool or asbestos, is also incorporated in the composition for use as a friction material. To this mass, a suitable quantity of blood is added, and the mass stirred until an even mixing and uniform distribution of the constituents throughout the mass is had. In my prior patents heretofore mentioned, an appropriate quantity of potassium carbonate is added, which acts upon the blood in the mixture to effect a thorough cohesion of the solids composing the composition.

In order to increase the toughness of the composition and to increase the co-efficient of friction thereof, it is preferable in some cases to incorporate a suitable proportion of ground or finely divided leather, it being generally preferable to use half the usual quantity of vegetable matter and to add thereto an equal quantity of leather, or, the leather may be used as a substitute for the vegetable matter.

In preparing the composition for use as a friction material, the wearing quality of the material is prolonged and rendered more uniform by the incorporation of an appropriate lubricating agent, such, for instance, as graphite or plumbago, this lubricant being added to the mixture in the proportion of one ounce thereof to each pound of vegetable matter, it being understood that the lubricating agent is distributed thoroughly throughout the mass.

In some cases it is advantageous to incorporate an additional binding agent, such, for instance, as sugar, which is added in the proportion of about two ounces to each pound of vegetable matter.

It is highly desirable that the composition be fireproof, and, in addition to the asbestos used, I substitute or add salts of sodium, such as benzoate of sodium in the proportion of two ounces of said salts of sodium to three pounds of blood. I also substitute or add ferrous salts, such as ferric oxide, in the proportion of one-fourth pound to two pounds of the already admixed mass. The addition of the ferrous salts adds to the wear-resisting qualities of the composition without lessening the frictional qualities thereof.

It will be understood, of course, that a composition made in accordance with my invention is adapted for many different uses, and while it is in a plastic condition it may be molded in any shape suitable for its intended uses, but the composition given as an example in the present embodiment of the invention possesses distinct advantages as a friction material of the character used in connection with composition brake-shoes, the fibrous texture of the vegetable matter cooperating with the binding materials to effect a thorough solidification of the mass so as to prevent fracture or disintegration thereof, the fibrous structure of the vegetable matter and asbestos giving the material a considerable degree of toughness. The asbestos and salts of sodium or benzoate of soda is particularly useful for the purpose of resisting heat generated by the friction between the material and the wheel tire or other friction surface with which it cooperates, and the asbestos and salts of sodium also renders the composition substantially fire-proof and gives the material a certain degree of softness or a yielding quality combined with an increased degree of toughness so that the composition when used on brake-shoes is capable of conforming to the contour of the wheel tire under considerable pressure without liability of breakage, and the softer quality of the material insures the proper degree of friction without liability of injuring or unduly wearing the tire of the wheel. In fact, the lining or filling made according to this formula will withstand an acetylene torch or approximately 8,000° F. This is due to the sodium compound and asbestos. The sodium compound is not used as a preservative or deodorant, but as a heat resister.

In using the composition as a friction facing for brake-shoes and similar devices, it has been found that under excessive pressures, certain ingredients give off an odor, and in using the material as friction facings for brake-shoes on vehicles operating in subways or tunnels, or in using the material as a friction medium in inclosed spaces or buildings, to add a suitable ingredient, such, for example, as ground juniper berries incorporated with the vegetable matter, will counteract or neutralize any odor of this kind that may arise by reason of such friction.

To make the composition more elastic, I substitute or add approximately two ounces of rubber in ground or powdered form to one pound of the mass. I find that by adding a vegetable oil, such as linseed or cottonseed oil in the proportion of one ounce of oil to one pound of the mass will render the same substantially waterproof and will lessen the friability of the finished composition.

When it is desired to give extra strength or hardness to the composition, I add casein to the mass in the proportion of one-fourth pound of casein to one pound of the composition. Coloring matter may also be added to give the desired color to the composition.

I claim:—

1. A composition for brake shoe fillings and linings, consisting of finely divided fibrous matter, an hydraulic cement, a heat-resisting agent composed of asbestos and a sodium compound, blood, and casein.

2. A composition for brake shoe fillings and linings, consisting of finely divided fibrous matter, an hydraulic cement, a heat-resisting agent composed of asbestos and a sodium compound, blood, casein, and siccative oil.

3. A composition for brake shoe fillings and linings, consisting of finely divided fibrous matter, an hydraulic cement, a heat-resisting agent composed of asbestos and a sodium compound, blood, casein, siccative oil, and rubber.

4. A composition for brake shoe fillings and linings, consisting of finely divided fibrous matter, asbestos, blood, cement, casein, siccative oil, rubber, and benzoate of soda.

5. A composition for brake shoe fillings and linings, consisting of finely divided fibrous matter, asbestos, blood, cement, casein, siccative oil, rubber, benzoate of soda, and ferrous salts.

In testimony whereof I have hereunto set my hand.

JACOB LAEUFER.